(12) United States Patent
Kim

(10) Patent No.: US 6,251,491 B1
(45) Date of Patent: Jun. 26, 2001

(54) LUMINOUS STICKER HAVING ORNAMENTAL EFFECT

(76) Inventor: Kyung Ja Kim, #106-401, Sungkwang Woobang Town, 127 Chilsung 2-ga, Buk-Ku, Daegu-City (KR)

(*) Notice: Subject to any disclaimer, the term of this patent is extended or adjusted under 35 U.S.C. 154(b) by 0 days.

(21) Appl. No.: 09/261,205

(22) Filed: Mar. 3, 1999

(51) Int. Cl.[7] .................................................. C09J 7/02
(52) U.S. Cl. ................... 428/40.1; 40/542; 252/301.4 F; 252/301.6 F; 252/301.33; 428/41.3; 428/41.6; 428/41.7; 428/42.1; 428/201; 428/202; 428/913
(58) Field of Search .................. 428/40.1, 41.3, 428/41.6, 41.7, 42.1, 201, 202, 913; 252/301.4 F, 301.6 F, 301.33; 40/542

(56) References Cited

U.S. PATENT DOCUMENTS

| | | | |
|---|---|---|---|
| 4,054,697 | 10/1977 | Reed et al. | 428/40.1 |
| 4,567,072 | 1/1986 | Brainard et al. | 428/40.1 |
| 4,605,592 | 8/1986 | Paquette et al. | 428/354 |
| 5,362,374 | 11/1994 | Chang | 205/164 |
| 5,839,718 | * 11/1998 | Hase | 252/301.4 F |

FOREIGN PATENT DOCUMENTS 11-43651 * 2/1999 (JP).

OTHER PUBLICATIONS

Abstract of Japanese Patent Publ. No. 9–158064; dated Jun. 17, 1997.
Abstract of Japanese Patent Publ. No. 10–020790; dated Jan. 23, 1998.

* cited by examiner

Primary Examiner—Nasser Ahmad
(74) Attorney, Agent, or Firm—Arent Fox Plotkin Kintner Kahn PLLC

(57) ABSTRACT

A method of manufacturing a luminous sticker having heterogeneous pasteboard 1, double-faced adhesive paper 2, and a luminous layer 3, wherein the sticker has a luminous layer 3 by adding light condensing material, which has good brightness and has long luminous time, to plastics which is a family of polyurethane, and has a surface protection layer 4 by attaching a transparent plastic film, on which a decorative pattern is printed on the back surface, to the upper of the luminous layer 3.

2 Claims, 1 Drawing Sheet

LUMINOUS STICKER HAVING ORNAMENTAL EFFECT

BACKGROUND OF THE INVENTION

1. Field of the Invention

This invention relates to the method of manufacturing a luminous sticker having ornamental effect and more particularly, to a luminous sticker having ornamental effect, which double-faced adhesive paper is adhering to heterogeneous pasteboard, wherein the sticker, after forming a plastic luminous layer, which is a family of polyurethane, having light condensing material which has good brightness and has long luminous time, plastic film, on which a decorative pattern is printed, is configured to be adhering on it.

2. Discussion of Related Art

Generally speaking, even though residential space such as a house and an office has illumination facilities for night, it is difficult to identify things because it is too dark indoors at the time of sudden electric power failure and blackout. Especially, there comes concern about a big accident taking place since users could not find the right place of a power switch and a doorway and an emergency exit. In addition to that, modern skyscrapers are mostly made of a cement structure and their windows are too small, so that it can be inconvenient for a user to identify the place of stairs and elevators due to sudden darkness when he comes in from the outside as it is too dark although it is day time in case that it is very cloudy.

In order to solve the above problems, previously, the additional installation of indoor emergency light or a tail light may be done or a small light may be installed at a switch box to be turned on or off so that a user may confirm the location of a light switch.

However these methods result in problems such as the unnecessary lose of electric power, the cumbersome of location confirmation, and the addition of cost.

Meanwhile, in order to conceal the dirty part and ornaments at a specific place, used are often the methods that a picture or pictures and writings are suspended or stickers are attached. However there is no different effect other than an ornamental effect when using a sticker. Also there is a week point in that a pattern part gets discolored by sunlight with ease and, if a fixed time elapses, gets dirty, and in the night it is impossible to identify things with a naked eye.

SUMMARY OF THE INVENTION

Accordingly, in order to overcome such drawbacks in the conventional art, it is therefore an object of the present invention to provide a luminous sticker, having an inherent ornamental effect specific to a sticker, which has an elegant decorative effect by emitting light within a dark building or in the night when a light turns off.

It is another object to provide relatively low cost sticker having the above object.

To achieve these and other advantages and in accordance with the purpose of the present invention, as embodied and broadly described, there is provided a method of manufacturing a luminous sticker having heterogeneous pasteboard 1, double-faced adhesive paper 2, and a luminous layer 3, wherein the sticker has a luminous layer 3 by adding light condensing material, which has good brightness and has long luminous time, to plastics which is a family of polyurethane, and has a surface protection layer 4 by attaching a transparent plastic film, on which a decorative pattern is printed on the back surface, to the upper of the luminous layer 3.

According to another aspect of the present invention, there is also provided the method of manufacturing a luminous sticker according to claim 1, wherein above light condensing material adds europium Eu as activator material to an aluminate ingredient which is alkali metals and is composed and manufactured, after adding at least one element among lanthanoid elements such as cerium Ce, praseodymium Pr, neodymium Nd, terbium Tb, holmium Ho.

According to another aspect of the present invention, there is also provided the method of manufacturing a luminous sticker according to claim 1 and 2, wherein luminous layer 3 adds 5–10 weight % of light condensing material to plastic which is a family of polyurethane.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

The method of manufacturing a luminous sticker having an ornamental effect of this invention is described in detail.

Figure 1:
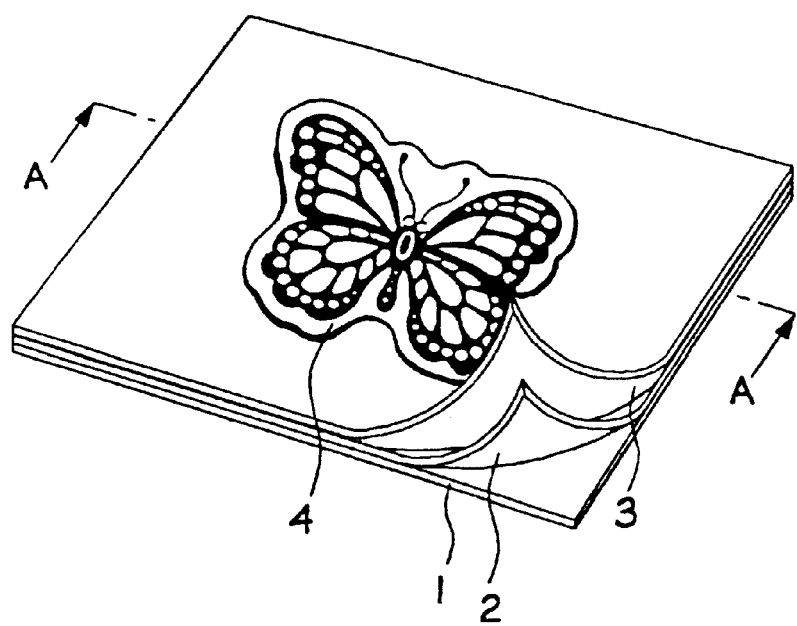
FIG. 1 is a perspective view showing a luminous sticker of this invention.
Figure 2:
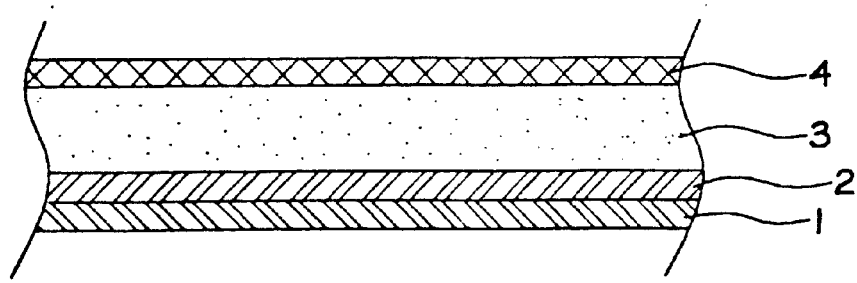
FIG. 2 is a cross-sectional view showing a luminous sticker of this invention.

FIG. 1 is a cross-sectional view showing a luminous sticker of this invention which uses a hardened plastic film or paper, heterogeneous pasteboard which is already generally used, while polyester coating or silicon coating should be done on a side, so that an adhesive which is spread on the surface of the double-faced adhesive paper 2 is kept from being spread and absorbed on heterogeneous pasteboard 1.

The essential elements of this invention are a luminous layer 3 comprising plastics which is a family of polyurethane which contains light condensing material, which has good brightness and has long luminous time, and a surface protection layer 4, which is attached to the top of a luminous layer 3 and which is made of a transparent plastic film, on which a decorative pattern is printed on the back surface. In this case, as a luminous layer 3 has no adhesive power itself, the heterogeneous pasteboard 1 is attached to a luminous layer 3 by using double-faced adhesive paper 2 perfectly.

The sticker of this invention can be attached on a desired location solidly by detaching it from a heterogeneous pasteboard 1 because it comprises a luminous layer 3, which is made to integrate in a body by double-faced adhesive paper 2, and a surface protection layer 4.

The light condensing material of this invention is newly developed chemical compound and is different from fluorescent substance, which is developed up to now, in characteristic. If a potential difference occurs by the heat of thermal energy, it emits light due to the potential difference and, as electric potential is stabilized, so emitting light is weakened, but it is ten times as much useful as the existing fluorescent substance and light condensing material are.

Describing more in detail, the light condensing material of this invention adds europium EU as activator material to an aluminate ingredient which is alkali metal and, after adding at least one element among lanthanoid elements such as cerium Ce, praseodymium Pr, neodymium Nd, terbium Tb, holmium Ho, composes them to manufacture it.

The luminous layer 3 of this invention adds, for effectiveness, 5–10 weight % of light condensing material to plastic which is a family of polyurethane although light-emitting ability depends on the amount of the above used light condensing material.

In case of below 5–10 weight % of light condensing material used, the light-emitting ability decreases undesirably and in the case of more than 10 weight % of light condensing material used, its forming ability decrease, so it is difficult to make a mat and plastic which are a family of polyurethane.

Plastic which is a family of polyurethane and a luminous layer 3 contains light condensing material and can use all kinds of things that can form a film and a mat layer. At the time when light emits, it is advisable for a use to use colorless and transparent light condensing material in order not to exert a bad influence upon it.

The surface-protecting layer 4, after printing a specific design or characters on a surface of a conventional transparent plastic film by the method of screen printing, protects the luminous layer 3 by thermally attaching the printed surface to the surface of the luminous layer 3, so at the time of emitting light, various designs and patterns can be represented and decorative effects can be achieved.

The luminous sticker of the invention, as above described, as silicon coating or polyester coating has been done on the heterogeneous pasteboard 1 which is made of paper or plastic film, can be easily separated from the heterogeneous pasteboard 1 since the adhesive on the double-faced adhesive paper does not sink into the heterogeneous pasteboard 1, so it shows a good adhesive characteristic at the time of attaching itself to the objects.

Also, the luminous layer 3 is made to be blended with both synthetic resin which is a family of polyurethane evenly, forms a top plate having constant thickness by meting and pressing out-method, and become a single body as it is attached thermally by a double-faced adhesive paper 2 and a surface protection layer 4.

When casting material melted between a plastic resin, which is a family of polyurethane and light condensing material which forms the luminous layer 3, there is no special limitation to its thickness. However, in case that the thickness is within the range which can include light condensing material up to the point where some brightness can remain, it does not make any problem. As far as casting is concerned, reverse roll coater or knife coating methods can be used.

With the luminous sticker, which is manufactured as the above described, as the light which is emitted from a luminous layer is emitted externally after passing the surface protection layer 4 of a transparent synthetic resin film which has a pattern printed on the top, various characters having some decorative effects printed on the inside of the surface protection layer 4 can be seen by the luminous layer even in the dark place.

With the above described luminous sticker, its brightness can be controlled by controlling the size of a sticker and, without additional power supply, it emits light, so not only it plays a part of a tail-light, but also it is convenient and useful as it can have some decorative effects.

It will be apparent to those skilled in the art that various modifications can be made in The method of manufacturing a luminous sticker having ornamental effect of the present invention, without departing from the spirit of the invention. Thus, it is intended that the present invention cover such modifications as well as variations thereof, within the scope of the appended claims and their equivalents.

What is claimed is:

1. A luminous sticker comprising a heterogeneous pasteboard, a double-faced adhesive paper having a first face and a second face, wherein the first face is attached to the pasteboard, a non-adhesive luminous layer which is attached to the second face of the adhesive paper, wherein the luminous layer comprises a mixture of a polyurethane-based plastic and a light condensing material comprising a europium activator, an alkali metal salt of aluminate, and a lanthanoid element selected from the group consisting of cerium, praseodymium, neodymium, terbium and holmium, and a surface protection layer having a back surface which is attached to the luminous layer, wherein the surface protection layer comprises a transparent plastic film and a decorative pattern formed on the back surface.

2. The luminous sticker of claim 1, wherein the light condensing material is present in the luminous layer in an amount which is 5–10 weight % of the amount of the polyurethane-based plastic.

* * * * *